Figure 1:
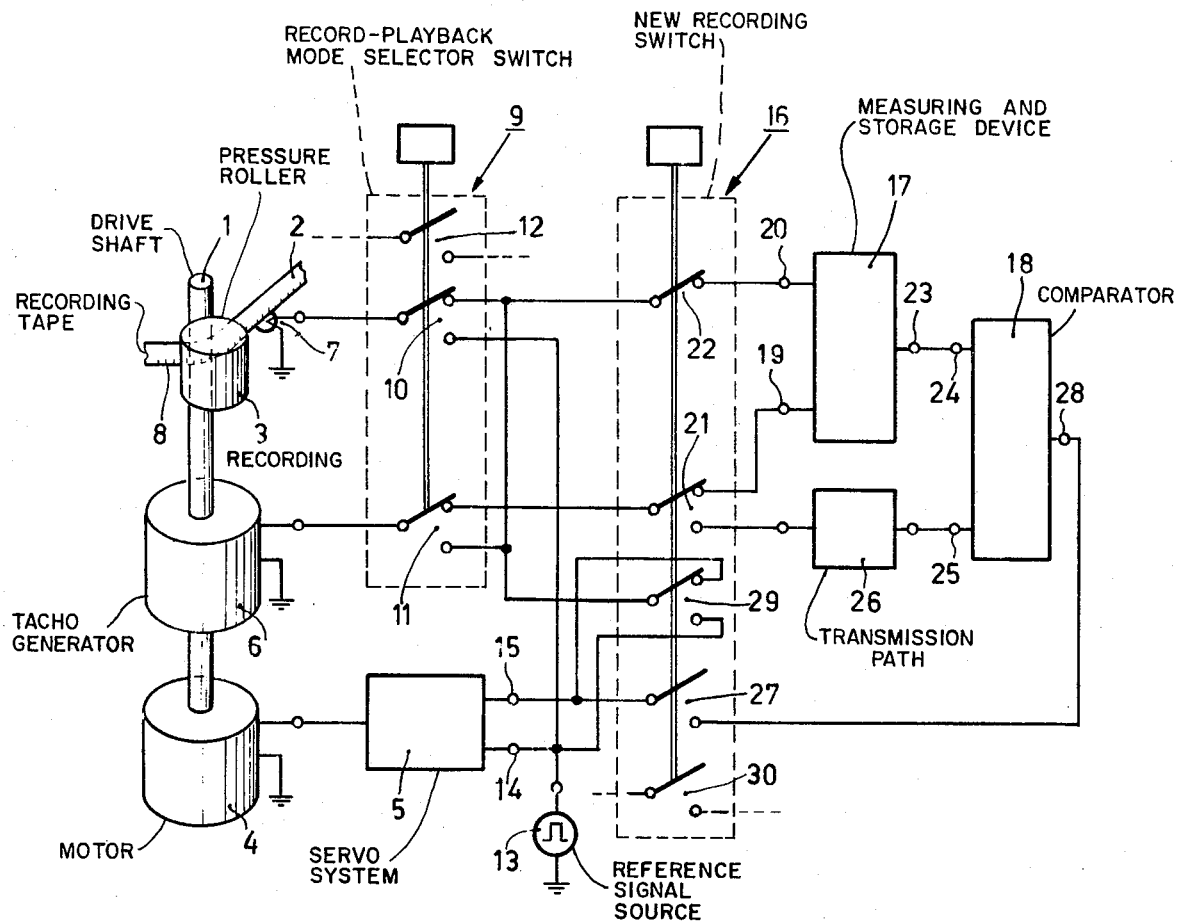

United States Patent [19]

Langer et al.

[11] 3,978,521
[45] Aug. 31, 1976

[54] RECORDING AND PLAYBACK APPARATUS FOR VIDEO TAPE EDITING

[75] Inventors: Erich Langer; Uwe Jahnke; Friedrich Sommer, all of Vienna, Austria

[73] Assignee: U.S. Philips Corporation, New York, N.Y.

[22] Filed: Feb. 21, 1975

[21] Appl. No.: 551,639

Related U.S. Application Data

[63] Continuation of Ser. No. 382,398, July 25, 1973, abandoned.

[30] Foreign Application Priority Data

Aug. 23, 1972 Austria .................................. 7277/72

[52] U.S. Cl. .................................... 360/14; 360/70; 360/73; 318/314
[51] Int. Cl.² ........................................... G11B 27/32
[58] Field of Search ................... 360/14, 36, 70, 73; 178/6.6 P, 6.6 A; 318/314, 318

[56] References Cited
UNITED STATES PATENTS

| | | | |
|---|---|---|---|
| 3,520,993 | 7/1970 | Jacoby | 178/6.6 P |
| 3,542,949 | 11/1970 | Tanaka | 178/6.6 P |
| 3,580,994 | 5/1971 | Kosaka | 360/70 |
| 3,636,252 | 1/1972 | Kowal | 178/6.6 P |
| 3,643,012 | 2/1972 | Clark | 360/70 |
| 3,662,098 | 5/1972 | Yano | 360/70 |
| 3,742,132 | 6/1973 | Sanguu | 360/70 |

*Primary Examiner*—Alfred H. Eddleman
*Assistant Examiner*—Alan Faber
*Attorney, Agent, or Firm*—Frank R. Trifari; Simon L. Cohen

[57] ABSTRACT

The invention relates to a recording and playback apparatus for video signals including a drive shaft for driving a record carrier, whose revolution speed can be controlled by a servo system, and a switching device to ensure that a new recording without interruption follows an existing recording, said apparatus comprising a measuring and storage device for measuring and storing the difference in phase between the pulses supplied by the tacho-generator and the pulses scanned from the synchronizaton track which device is followed by a comparator, for comparing the stored measuring value with the reference signal for the servo system, which comparator if its input signals are equal supplies its output signal to the servo system as the measuring signal. Such a servo system prevents the occurrence of undesired phase shifts at the transition from the existing recording to the new recording. The stored value, representing the phase difference between the tach signal and the recorded vertical sync signal, controls the delay of the tach signals when a new video insert is added.

10 Claims, 3 Drawing Figures

RECORDING AND PLAYBACK APPARATUS FOR VIDEO TAPE EDITING

This is a continuation of application Ser. No. 382,398, filed July 25, 1973, now abandoned.

The invention relates to a recording and playback apparatus for video signals, comprising a drive shaft for advancing a record carrier, a servo-system for controlling the speed of the drive shaft and a tacho-generator connected thereto for supplying a pulse train which is proportional to the instantaneous speed. Field synchronizing pulses of the signal to be recorded, which are simultaneously recorded in a separate synchronization track on the record carrier, are applied to the servo-system as the desired signal and the pulses supplied by the tacho-generator are applied as the measuring signal in the "recording" mode. In the "playback" mode pulses derived from a reference signal source are applied as the desired signal and the pulses scanned from the synchronization track are applied as the measuring signal. In order to ensure that a new recording without interruption follows at an artistically selected point of an existing recording on a record carrier, the apparatus comprises a switching device to perform such a new recording. The synchronizing pulses of the signal to be recorded are applied to the servo system as the desired signal in the "playback" mode and pulses which are locked to the field synchronizing pulses of the signal to be inserted are recorded in the synchronization track when the switching device is set to the "new recording" mode. With such an apparatus a new recording should follow without interruption in such a way that preferably no picture disturbances at all occur at the transition from the existing to the new recording, i.e. that the synchronization be disturbed to the least possible extent and the new synchronizing signals to be recorded on the record carrier follow the previously recorded synchronizing signals without interruption. The major cause of the occurrence of a picture disturbance as described above is that at the transition to a new recording the servo system suddenly receives a different measuring signal, which may result in a substantial phase shift. In order to avoid such difficulties, it is known to include a tacho-generator, which every revolution supplies a plurality of pulses which are related to the pulses scanned from the synchronizing track, from which a control parameter is derived. Upon selection of the "new recording" mode out of the plurality of pulses supplied by the tacho-generator the known apparatus selects that pulse as the next pulse for the measuring signal of the servo system, which at that instant directly follows the pulse scanned from the synchronization track, while subsequently the measuring signal is also derived from the tacho-generator pulses.

It is an object of the invention to provide a very simple solution to these problems as regards the technology and circuit design of an apparatus of the type as mentioned in the preamble. The invention is characterized in that a measuring and storage device followed by a comparator is provided, and that the measuring and storage device is adapted to measure the phase shift between the pulses supplied by the tacho-generator and those derived from the synchronization track and to store each time the last of these measuring values. One pulse train each time initiates the measuring processes and the other pulse train terminates said processes, and the comparator comparing the stored measuring value, has applied to its one input, the reference signal, and has applied to its other input a transmission path which is provided for deriving a reference signal from the pulse train used for initiating the measuring processes. If the two signals are equal the comparator supplies a pulse-shaped output signal each time, which by means of the switching device is fed to the servo-system as the measuring signal in the "new recording" mode. Depending on the selected accuracy of determining the difference in phase of the two pulse trains, the residual disturbance can be adapted to meet the requirements imposed on the apparatus. The phase difference can be measured in different manners, as will be set out hereinafter. For the measurement per se either digital or analog, but also analog and digital methods are available. The same also applies to the method of storing the measurement value.

As previously stated, it is of importance that when making a new recording the signal in the synchronization track on the record carrier is continued uninterruptedly; for this purpose pulses may be applied, for example, which are derived directly from the field synchronizing pulses of the signal to be recorded. However, it has been found advantageous when in the "new recording" mode the output signal supplied by the comparator is recorded in the synchronization track. Thus, those disturbances are also avoided which arise as a result of tolerances in the geometry of individual apparatus, when a recording made on one apparatus is continued on another apparatus.

The measuring and storage device may be designed so that after each complete measuring cycle, which is given by the time elapsing between two consecutive pulses of the two pulse trains, the instantaneous measurement value of the difference in phase between the two pulse trains is transferred to a memory, which retains this value until the next measuring cycle is terminated. In such an embodiment, upon completion of the first measurement cycle, changing over to the "new recording" mode is possible at any arbitrary instant, i.e. this mode may follow the "playback" mode after a delay time which for safety is slightly longer than the time elapsing between two consecutive pulses of either pulse train. Field synchronizing pulses of the signal to be recorded are applied to the servo-system as the desired signal, which can be achieved with conventional switching means having a certain delay. An extremely simple design of the measuring and storage device is obtained, however, when the storage device follows the measuring process and the switching device includes a gate circuit, which does not render the selected "new recording" mode effective until after the appearance of a pulse which occurs upon selection and said mode and which defines the termination of a measuring process, the supply of signals to the storage device then being discontinued.

In this respect it has further proved to be advantageous when the measuring and storage device includes a bistable multivibrator having two inputs, to which via one input pulses are applied which are supplied by the tacho-generator for setting the bistable multivibrator to the one state and to which via the other input the pulses derived from the synchronization track are applied for setting the bistable multivibrator to its other state. A switching process is performed by this multivibrator when it is set to either state, which causes the storage device, whose output is connected to an input of the comparator, to be connected to the transmission path which is connected to the other input of the comparator and which is included for the formation of the reference signal. Thus, the measuring cycle is determined by the mere inclusion of a bistable multivibrator. In this respect it has been found to be advantageous when the pulses supplied by the tacho-generator are used each time for initiating a measuring process and when the pulses derived from the synchronization track are used for the terminating the said process, because the reference signals for the comparator can then also be derived from the pulse train which is also available in the case of a new recording. If this were not the case, a separate generator would have to be included for the formation of the reference signal, which without interruption continued the original signal of the "playback" mode when the "new recording" mode were selected, because in the "playback" mode no pulses are available from the synchronization track. Such a generator could for example be a flywheel oscillator to be triggered while the operation was still in the "playback" mode by pulses derived from the synchronization track.

Measuring and storage devices operating on a digital basis have proved to be particularly advantageous, especially as regards to their stability and storage properties. Therefore, in addition to the previously described embodiments, a further embodiment of the invention is characterized in that the transmission path for the formation of the reference signal includes a first counter which comprises a count input and a reset input. Pulses from an auxiliary pulse source are applied to the count input for advancing the counter and pulses supplied by the tacho-generator are applied to its reset input for resetting the counter to its initial state. The storage device is constituted by a second similar counter, which during a switching process which is performed by the bistable multivibrator and which is initiated by a pulse supplied by the tachogenerator, is connected to the reset input of the first counter with its reset input and to the auxiliary pulse source with its count input. For this it is advantageous when the frequency of the line pulses of the signal to be recorded is an integral multiple of the frequency of the pulses from the auxiliary pulse source. This last step ensures that the measuring process is related to the occurrence of the pulses from the tacho-generator, and that in the absence of disturbances in the system the magnitude of the measuring quantity for the instantaneous phase difference is not subject to fluctuations.

In this respect it has proved to be advantageous for measuring and storage devices operating on an analog basis, when the transmission path for the formation of the reference signal includes a sawtooth generator which is synchronized by the pulses supplied by the tacho-generator and when the storage device is formed by a capacitor, which during a switching process performed by the bistable multivibrator and initiated by a pulse supplied by the tacho-generator is connected to the output of the sawtooth generator, preferably via an amplifier connected in emitter-follower arrangement. Such a device can be realized very simply in respect of circuit design.

A further suitable embodiment of the invention is characterized in that the transmission path provided for the formation of the reference signal includes a first signal generator and the measuring and storage device, a second signal generator for the formation of periodic signals with different rise times, each of the said generators having a reset input via which the relevant generator can be reset to an initial state upon application of a pulse-shaped signal, while pulses supplied by the tacho-generator are applied to the reset input of the first signal generator. The first signal generator produces signals with a long rise time. Pulses derived from the synchronization track are applied to the reset input of the second signal generator, which produces signals with a short rise time. The outputs of the signal generators, as the case may be with the inclusion of the signal conversion stages, are connected to the comparator inputs. The second signal generator comprises a further input which is connected to the comparator output, with the aid of which upon the appearance of an output signal the signal generator can be clamped at its instantaneous value, which is stored in the storage device.

Again, the signal generator may be of the digital or the analog type an arbitrary combination of the two types being also permitted. In a suitable embodiment, however, at least the second signal generator is constituted by a counter, which is supplied from an auxiliary pulse source, thus utilizing the advantages of digital pulse systems as regards their stability and storage properties. In respect of the precision of the measuring process it has proved to be effective that the rise time of the signal supplied by the second signal generator is at least 100 times shorter than the rise time of the signal supplied by the first signal generator.

The invention will now be described in more detail, by way of example, with reference to some embodiments which do not limit restrict the scope of the invention.

Figure 2:
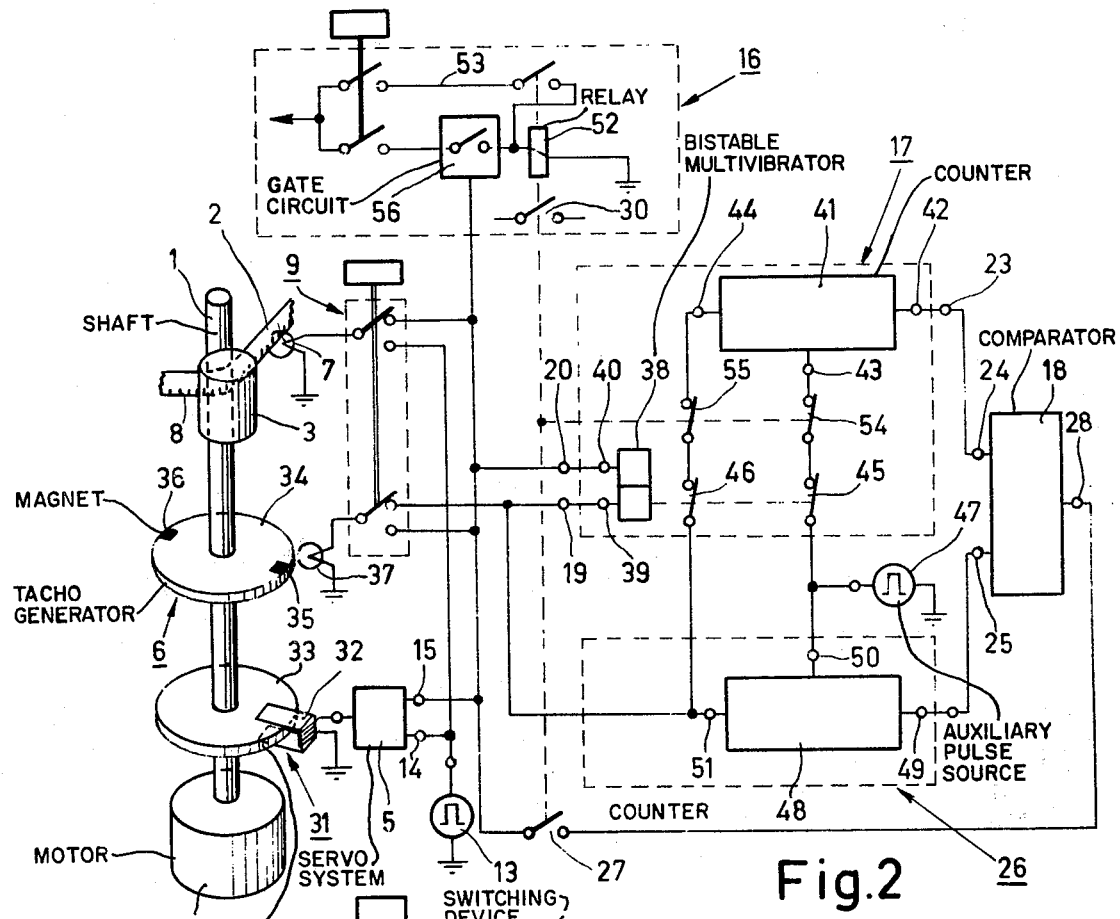
Figure 3:
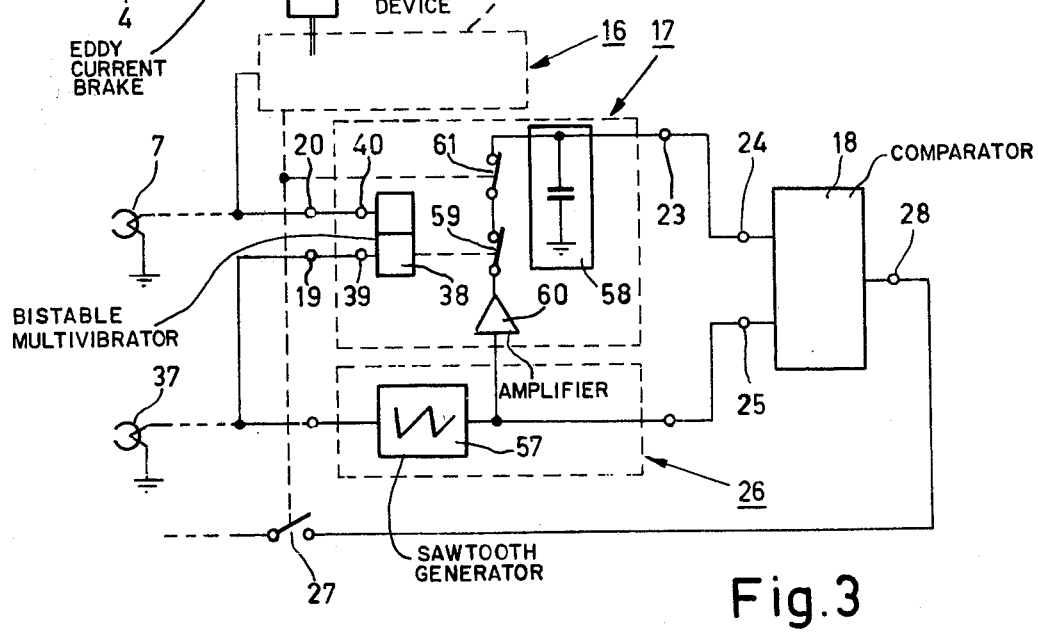
Figure 4:
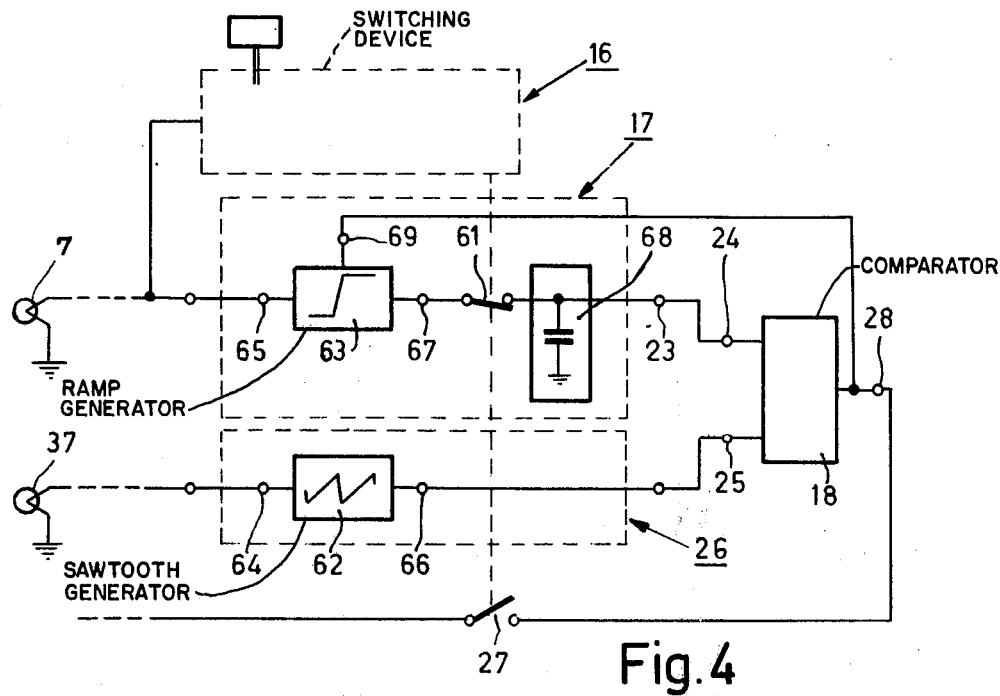
Figure 5:
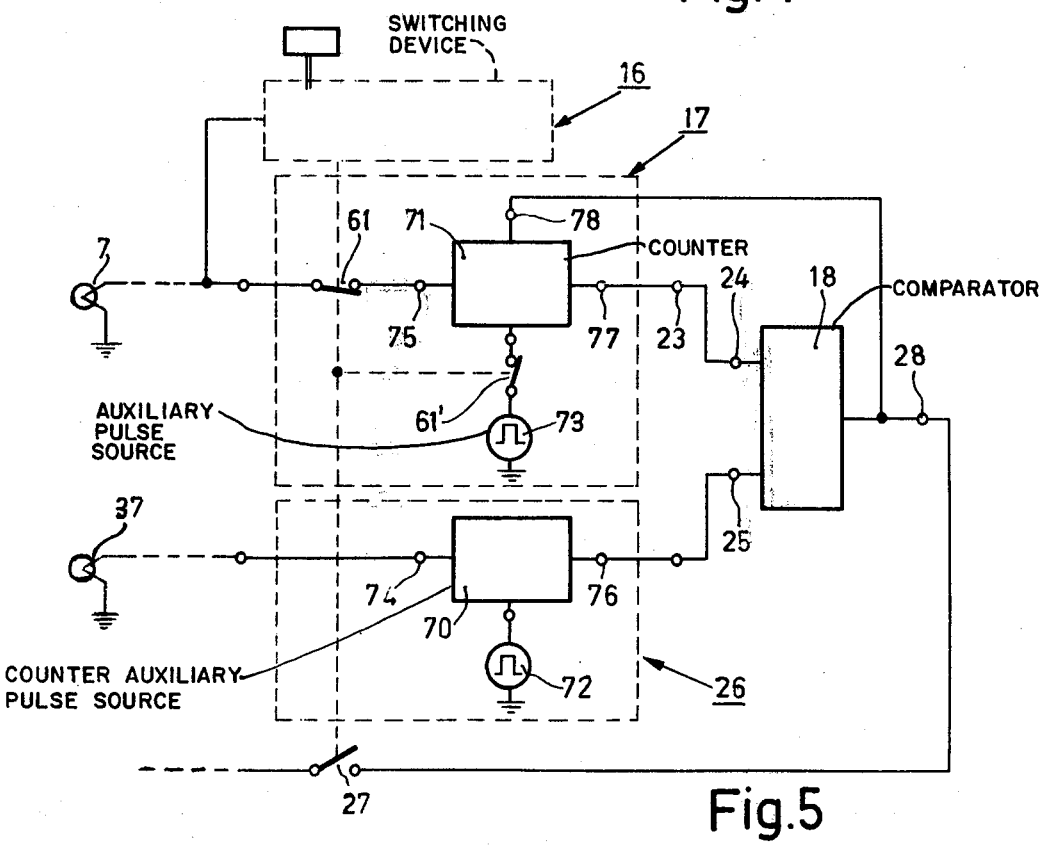

FIG. 1 shows the basic construction of an apparatus according to the invention,

FIG. 2 shows an apparatus in which the measuring and storage device includes a bistable multivibrator and the measuring and storage process operates on a digital basis, FIG. 3 shows a modification of the embodiment of FIG. 1, in which the measuring and storage process operates on an analog basis, FIG. 4 shows an embodiment, in which both the transmission path and the measuring and storage device include a signal generator, the signals from these generators which have different rise times being compared with each other in the comparator so as to obtain a measurement value, and FIG. 5 shows a modification of the embodiment of FIG. 4, in which the signal generators are formed by counters.

In FIG. 1 the reference numeral 1 refers to a drive shaft, with which a record carrier 2 in the form of a tape is made to engage effectively with the aid of a pressure roller 3 so as to drive said carrier. The drive shaft is driven by a motor 4, which is controlled by a servo-system 5 for controlling the speed of the drive shaft. Connected to the drive shaft is a tacho-generator 6 for supplying a pulse train which is proportional to the instantaneous speed of said shaft. A magnetic head 7 which serves for recording and playback cooperates with the record carrier 2, said head scanning a track 8 which extends in the longitudinal direction of the record carrier for recording respectively reproducing synchronizing pulses. A mode selector switch 9 serves for setting the apparatus to the "recording" and "playback" modes; in FIG. 1 the swtich is set to "playback". Said mode selector includes two switching devices 10, 11 associated with the servo system; another switch 12 which is actuated by the modes selector symbolically indicate that the mode selectors in the apparatus also performs another switching processes, such as for example switching over of the amplifiers which process the video signal. Finally, a reference signal source 13 is provided, by means of which pulses are applied to the servo system, which are derived either from the field synchronizing pulses of a video signal or from the mains voltage. An automatic switching device may be included, which ensures that when no field synchronizing pulses are available. The pulses are derived from the mains voltage. All further components of the apparatus are not shown, because they are not relevant to the present invention; this also applies to separator stages, auxiliary amplifiers and further similar devices generally employed in this type of apparatus.

In the "playback" mode the pulses from the reference signal source 13 are applied to the servo system 5 via its input 14 as the desired signal and the pulses scanned from the synchronization track 8 are applied to the magnetic head 7 via its input 15 as the measuring signal. When the mode selector 9 is changed-over, the "recording" mode is selected and pulses which are now automatically derived from the field synchronizing pulses of the video signal to be recorded are fed from the reference signal source 13 to input 14 of the servo system as the desired signal and the pulses supplied by the tachogenerator are fed to its input 15 as the measuring signal. Simultaneously the pulses from the desired signal are recorded in the synchronization track 8 by the magnetic head 7.

To ensure that a new recording without interruption follows at an arbitrary point of an existing recording on a record carrier the apparatus includes a switching device 16 for making such a new recording, pulses which are now automatically derived from the field synchronizing pulses of the signal to be recorded, starting from the "playback" mode, being applied from the reference signal source 13 to the servo system via its input 14 as the desired signal. The switching device 16 is then in the position shown in FIG. 1. Thus, the servo system is synchronized in accordance with the field synchronizing pulses of the signal to be recorded at a later instant and is thus prepared for new recording.

To prepare for a new recording the apparatus further includes a measuring and storage device 17 followed by a comparator 18. The measuring and storage device has two inputs 19 and 20. The pulses supplied by the tachogenerator are fed to the input 19 via switch 21 of the switching device 16 and the pulses derived from the synchronization track are fed to the input 20 via a switch 22 of the switching device 16. The measuring and storage device determines the phase difference between the pulse trains applied to it with the measuring device and always retains the last measurement value in the storage device. It is then assumed that the pulse train supplied by the tachogenerator each time initiates the measuring processes and that the pulse train derived from the synchronization track terminates these processes. The stored measurement value is applied to an input 24 of the comparator 18 via the output 23 of the measuring and storage device 17.

Thus, prior to a new recording, the difference in phase between the pulses supplied by the tachogenerator and those derived from the synchronization track is determined continually so as to obtain a reference quantity for the mutual relationship between the actual movement of the record carrier and the drive of the drive shaft. If when switching to a new recording care is taken that the phase difference thus determined is also available during the new recording, the new recording will follow the original recording without any disturbances. During a new recording a reference signal derived in a transmission path 26 from the pulses supplied by the tachogenerator is therefore applied to the second input 25 of the comparator, which signal is continuously compared by the comparator with the last stored measurement value. The comparator supplies a pulse shaped output signal each time that the two signals are equal. Said output signal is subsequently fed to the input 15 of the servo system as the measuring signal. Consequently, the measuring signal for the servosystem in the case of a new recording consists of pulses which relative to the pulses applied by the tacho-generator which form the measuring signal during a normal recording, are shifted over a time interval which is given by the phase difference between the pulses supplied by the tachogenerator and the pulse derived from the sychronization track which is measured prior to the new recording. Viewed from the servo system, the measuring signal in the case of a new recording therefore forms an uninterrupted continuation of the preceding measuring signal during playback, so that no appreciable phase shift occurs between the two signals and the picture is not disturbed.

In the embodiment of FIG. 1 the above stated steps have been realized, in that when the switching device 6 is actuated, thus switching on the "new recording" mode, the transmission path 26 which is already connected to the second input 25 of the comparator is connected to the tachogenerator 6 by means of the switch 21, the inputs of the measuring and storage device being open-circuited simultaneously by the switch 22 of the switching device 16, so that no further measurement value can be produced. A switch 27 of the switching device 16 connects the output 28 of the comparator 18 to the input 15 of the servo system. Further, a switch 29 of the switching device 16 disconnects the magnetic head 7 from the input 15 of the servo system and instead connects it to the reference source 13 which supplies the desired signal for the servo system, so that in the synchronization track those of the pulses derived from the field synchronizing pulses of the signal to be recorded are recorded for which the operation of the servo system as described above, also ensures that they uninterruptedly follow the pulses of the original synchronizing signal already recorded on the record carrier. Again a further switch 30 of the switching device 16 symbolically indicates that the switching device also performs other switching operations required for a new recording.

In the present embodiment it is assumed that each measurement value of the phase difference between the two pulse trains is not transferred to the storage device until after each complete measuring cycle, i.e. that only the measuring result and not the measuring process itself influences the storage device. As in the present instance a measuring cycle is given by the occurrence of a pulse from the tachogenerator and the subsequent pulse derived from the synchronization track, the measuring result can simply be transferred to the storage device by means of a gate circuit which is controlled by pulses derived from the synchronization track. Accordingly, the "new recording" mode may be started when in the "playback" mode a measuring cycle has terminated, provided that a signal to be recorded is being applied to the apparatus. As the time elapsing before a measuring cycle is very short, changing over to the "new recording" mode is possible almost immediately after the signal to be recorded has been applied to the apparatus and the servo system is synchronized by the field synchronizing pulses thereof. The maximum time elapsing before a measuring cycle is determined by two consecutive pulses from the tachogenerator. In order to avoid any errors in the event of premature switching to the new recording mode, the switching device 16 may introduce a certain delay with respect to the actuation of its switching functions.

The embodiment of FIG. 2 again includes a shaft 1, which is driven by a motor 4. To control the speed of the drive shaft, the servo system 5 functions as an eddy current brake 31, which consists of the brake magnet 32 which is energized by the servo system and a brake disc 33 which is connected to the drive shaft. The tachogenerator 6 has a disc 34 which is connected to the drive shaft, which at its circumference carries two permanent magnets 35, 36. As the disc rotates the magnets pass a stationary magnetic head 37, so that the magnetic head produces a pulse train which is proportional to the instantaneous speed of the drive shaft. Further, the operation of the servo system in the "recording" and "playback" modes is the same as in the embodiment of FIG. 1.

The measuring and storage device 17 includes a bistable multivibrator 38 having two inputs 39 and 40, to which the pulses supplied by the tachogenerator 6 for setting the bistable multivibrator to its one state via the input 39 and to which the pulses derived from the synchronization track 8 are applied via the input 40 for setting the bistable multivibrator to its other state. The time during which the bistable multivibrator is in the first mentioned state is used for determining the difference in phase between two pulse trains, i.e. the pulse train supplied by the tachogenerator each time initiates the measuring processes, and the pulse train derived from the synchronization track terminates the said processes. The switching processes to be performed by the bistable multivibrator are consequently initiated by the pulses supplied by the tachogenerator. Further, a counter 41 which operates as a storage device is provided, whose output 42 is connected to the input 24 of the comparator 18. Said counter has a count input 43 and a reset input 44. A switch 45 and 46 respectively, which is operated by a bistable multivibrator 38 is connected in series with the respective input. The two switches 45, 46 are closed when the bistable multivibrator is in the state to which it has been set by the pulses supplied by the tachogenerator. An auxiliary pulse source 47, which supplies counting pulses which advance the counter 41, is connected to the switch 45.

The transmission path 26 includes a similar counter 48 as is used in the measuring and storage device. The output 49 thereof is connected to the second input 25 of the comparator 18. This counter also has a count input 50 and a reset input 51. The count input 50 is connected to the auxiliary pulse source 47 and the pulses supplied by the tachogenerator 6 are applied to the reset input 51. Thus, the counter 48 is used for deriving a reference signal for the comparator 18 from the pulse train for initiating the measuring processes. Finally, the switch 46, which is connected in series with the reset input 44 of the counter 41, is connected to the reset input 51 of the counter 48.

The switching device 16 includes means which render its switching functions effective with a delay. The actual switches are rendered operative by a relay 52 having a holding circuit 53, and consist of the switch 27, which connects the output 28 of the comparator 18 to the input 15 of the servo system, and switches 54 and 55, which are connected in series with the switches 45 and 46, which disconnect the count input and the reset input of the counter 41 and thus interrupt the application of signals to the counter 41. In series with the relay 52 a gate circuit 56 is included which is controlled by the pulses scanned from the synchronization track. In the present instance the pulses scanned from the information track each time define the end of a measuring process. The gate circuit is closed only upon the occurrence of one of the said pulses. This gate circuit thus brings about a delay, in such a way that independent of when the switching device 16 is put into operation, its switching functions are not rendered effective until the next pulse is scanned from the synchronization track, because only then is the relay 52 energized and holds itself in this condition until the switching device is switched off again.

The operation of the apparatus is as follows. The apparatus is in the "playback" mode and the signal to be recorded is applied to the apparatus, so that the reference signal source 13 supplies pulses which are derived from the field synchronizing pulses of this signal and the servo system is synchronized by said pulses. When a pulse supplied by the tachogenerator appears the bistable multivibrator 38 is set to the state in which it holds the switches 46 and 45 closed. Further, when a pulse supplied by the tacho-generator appears, the counters 41 and 48 are reset to their initial states, after which they start counting under control of the auxiliary signal source 47. When subsequently a pulse is scanned from the synchronization track, the bistable multivibrator is set to the state in which it keeps the switches 45 and 46 open, so that the counter 41 is stopped; in the mean time the counter 48 advances. Thus, the difference in phase between the pulse from the tachogenerator and the subsequent pulse from the synchronization track is stored by the counter 41 as a count. This process is constantly repeated.

When the switching device 16 is actuated, for switching on the "new recording" mode, the subsequent pulse derived from the synchronization track energizes the relay 52. At this instant a measuring cycle is terminated and the instantaneous phase difference is stored in the counter 41 as a count; owing to the switches 54 and 55 being opened this count is retained and serves as a reference quantity for the comparator 18. When the next pulse from the tacho-generator appears, the bistable multivibrator 38 is changed over, but this has no effect because the switches 54 and 55 are already open. The counter 48, however, is set to its initial state by this pulse from the tachogenerator, after which it starts counting again. These continuous counts which are applied to the second input of the comparator 18, now serve as the reference signal for the comparator, which continuously compares it with the count of the counter 41. When the counter 48 finally reaches the count of the counter 41, the comparator 18 produces a pulse at the output 28, which is applied to the input 15 of the servo system 5 as the measuring signal. This process is constantly repeated, as long as the "new recording" mode is switched on. Therefore, as will be evident, virtually no phase shift will occur for the servo system during the transition from a measuring signal in the "playback" mode to the other measuring signal in the "new recording" mode.

Of course, the accuracy with which a phase shift is avoided depends on the time interval between the individual counting increments, or on the magnitude of the pulse repetition rate of the auxiliary signal source 47. In this respect, it has proved to be advantageous when the frequency of the line pulses of the signal to be recorded is an integral multiple of the frequency of the pulses of the auxiliary pulse source. Thus, it is ensured that during the individual measuring processes counting commences each time at a predetermined instant after the occurrence of a pulse from the tachogenerator, so that if the phase relationship between the two pulse trains has not changed, no change in the number of counting steps within the measuring cycles will occur.

In order to limit the counter capacities it is recommended to select a pulse repetition rate of the auxiliary pulse source which is not equal to the line frequency, but smaller than this frequency by a factor of which the line frequency is an integral multiple.

As appears from FIG. 2, the reference signal supplied by the comparator 18 in the "new recording" mode is recorded on the synchronization track as the new synchronizing signal in this embodiment; for this purpose it is not only applied from the output 28 via the switch 27 to the input 15 of the servo system, but also to the magnetic head 7. This has proved to be advantageous because it also obviated phase transients resulting from tolerances in the geometry of the individual apparatuses, when a recording which was made on one apparatus, is followed by a new recording on another apparatus. This is because the pulses supplied by the comparator are in a fixed relationship with the pulses which are scanned from the synchronization track, so that timing errors between the pulse trains which depend on the record carrier movement are also taken into account. It is extremely favourable, to utilize this step, when an apparatus is equipped with a phase shifter for the compensation of tolerances in the geometry of an apparatus and variations in size of the record carrier, in order to influence the desired signal for this servo system accordingly.

In the embodiment of FIG. 3 the transmission path 26 for the formation of the reference signal for the comparator 18 includes a sawtooth generator 57 which is synchronized by the pulses supplied by the tachogenerator. The measuring and storage device 17, as in the embodiment of FIG. 2, incorporates a bistable multivibrator 38 which is operated in the same way. In this case a capacitor 58 is used as a storage device, which during a switching process performed by the bistable multivibrator 38 is connected via a switch 59 to the output of the sawtooth generator 57 with the aid of an amplifier 60 which operates as a voltage follower. The switching device 16 is similar to that in the embodiment of FIG. 2; this also applies to the other sections of the apparatus, which for the sake of clarity are not shown. This is also applies to the following embodiments of FIGS. 4 and 5. A switch 61 which is operated by the switching device 16 is again included in series with the switch 59, which is controlled by the bistable multivibrator 38.

At the occurrence of a pulse from the tachogenerator a sawtooth cycle from the generator 57 is started, the swtich 59 being closed simultaneously with the aid of the bistable multivibrator 38. In the "playback" mode the switch 61 is closed, so that the voltage at the capacitor 58 continuously follows the output voltage of the sawtooth generator. When the next pulse scanned from the synchronization track appears, the bistable multivibrator 38 opens the switch 59, so that the instantaneous voltage value of the sawtooth signal is stored in the capacitor 58 until the next cycle commences. However, when changing over to the "new recording" mode with the switching device 16, the switch 61 is opened upon termination of a measuring cycle, so that also after this the last measuring value remains stored in the capacitor 58. The comparator 18 then continuously compares this stored measuring value with the sawtooth signal applied to its input 25 and supplies a pulse at its output each time that the voltage values are equal.

In the embodiment of FIG. 4 the transmission path 26, in which the pulses supplied by the tachogenerator are converted into a reference signal, includes a first signal generator 62. The measuring and storage device 17 comprises a second signal generator 63, said generators periodically supplying signals with different rise times. The two signal generators each have a reset input 64 and 65 respectively, via which they can be reset to an initial state upon receipt of a pulse-shaped signal. In the present instance the signal generator 62 is a sawtooth generator and the signal generator 63 is a ramp generator. The sawtooth generator 62 produces signals with a long rise time and the pulses supplied by the tachogenerator are fed to its reset input 64; its output 66 is connected to the input 25 of the comparator 18. The ramp generator 63 produces signals with a short rise time and the pulses scanned from the synchronization tracks are applied to its reset input 65; via a switch 61 which is operated by the switching device 16 its output is connected to a storage device 68 in the form of a capacitor and via the latter to the input 24 of the comparator 18 whose output 28 is connected to a further input 69 of the ramp generator, via which said generator can be clamped at the instantaneous value of its signal at the occurrence of an output signal from the comparator.

When a tachogenerator pulse appears a sawtooth generator 62 is set to its initial state, after which its output voltage increases with a predetermined rise time. This signal is fed to the comparator 18. If subsequently a pulse is scanned from the synchronization track, the ramp generator 63 is reset to its initial state, after which its output voltage rises rapidly. This signal is applied to the storage device 68 and also to the comparator 18. When the last mentioned signal has assumed the value of the first signal, the comparator produces a pulse at its output 28, which clamps the ramp generator 63 at its instantaneous value. In the storage device 68 this instantaneous value is stored. This process is repeated until by the actuation of the switching device 16 the "new recording" mode is switched on. This implies that the switch 61 is opened after a complete measuring cycle and subsequently the last measuring value stored in the storage device 68 is available as a reference quantity for the comparator. Thus, the comparator always supplies an output pulse when the sawtooth which is initiated by a pulse from the tachogenerator reaches the last measuring value which was stored. Thus, a measuring signal is available again for the servo-system in the "new recording" mode, which signal follows the preceding measuring signal in the "playback" mode without any substantial phase shift.

In this instance the accuracy of the measuring process is first of all determined by the ratio of the rise times of the signals from the two signal generators. Favourable results have been obtained when the rise time of the signal supplied by the second generator 63 was at least 100 times shorter than the rise time of the signal supplied by the first signal generator 62.

The embodiment of FIG. 5 is analogous to the embodiment of FIG. 4. The signal generators, however, are now formed by counters 70 and 71, which are driven by the auxiliary pulse sources 72 and 73 respectively, the frequency of the pulses from the source 73 being considerably higher than that of the pulses from the source 72. The reset inputs of the counters are designated 74 and 75 respectively and their outputs 76 and 77 respectively. The counter 71 had a further input 78, which is connected to the output 28 of the comparator 18, via which the instantaneous count of the counter can be retained by applying a pulse. The counter 71 now also acts as a storage device. Hence, the switching device 16 with switches 61 and 61' directly influences this counter.

The operation is also the same as that of the embodiment of FIG. 4, except for the fact that in this case the comparator compares the counts.

It is obvious that numerous modifications of the above-mentioned embodiments are possible within the scope of the invention. For example, starting from the embodiments of FIGS. 4 and 5, the signal generator in the transmission path 26 might be constituted by a sawtooth generator and the signal generator in the measuring and storage device might be constituted by a counter followed by a digital/analog converter. As previously stated, it is in fact, irrelevant whether the difference in phase between the two pulses trains is determined on the basis of the pulses supplied by the tachogenerator with respect to the subsequent pulses which are scanned from the synchronization track, or on the basis of the pulses which are scanned from the synchronization track with respect to the relevant, subsequently appearing pulses supplied by the tachogenerator. Nevertheless, the first method has proved to be advantageous in practice, because in that case the reference signal for the comparator can simply be derived from the pulses supplied by the tachogenerator. The above applies in particular with a view to the design of the separate switching groups, the sequence of the switching processes and the practical embodiment of the schematically outlined concepts.

What is claimed is:

1. A recording and playback apparatus for video signals, of the type having "record", "playback" and "new recording" modes, comprising a drive shaft for moving a record carrier; a servo system for controlling the speed of the drive shaft; a tachogenerator connected to the drive shaft for supplying a pulse train having a frequency and phase proportional to the speed and angular position of the drive shaft; a recording and playback head;

first switch means operable in said "record" mode for applying field synchronization pulses of a first video signal to be recorded to said recording and playback head to record said field synchronization signals on a field synchronization track and for applying said tachogenerator pulse train to said servo system as a measuring signal; terminal means for applying said field synchronization pulses from said first video signal to be recorded to said servo system as a reference signal;

said terminal means further comprising means for receiving reference signal pulses and for applying said reference signal pulses to said servo system in said "playback" mode as a reference signal; said first switch means further comprising means operable in said "playback" mode for disconnecting said tachogenerator from said servo system and for connecting said record and playback head to said servo system to utilize said recorded field synchronization pulses as a measuring signal; phase comparison and storage means for comparing the phase of two applied pulsatory signals and for periodically storing said compared phase; second switch means operable in said "playback" mode for applying the recorded field synchronization pulses from said record and playback head to said phase comparison and storage means as a first pulsatory signal and for applying said pulse train from said tachogenerator to said phase comparison and storage means as a second pulsatory signal; said reference signal pulses applied to said terminal means prior to initiation of said "new recording" mode comprising field synchronization pulses of a second video signal to be recorded immediately following said first recorded signal, said phase comparison and storage means thereby storing the phase difference between the synchronization signal of the new video signal to be recorded and the tachogenerator signal;

said second switch means further comprising means operable in said "new recording" mode for deactivating the comparison function of said phase comparison and storage means whereby the phase difference between the tachogenerator signal and the field synchronization pulses of the new video signal to be recorded, is stored; a signal comparator; means connecting the stored phase difference from said phase comparison and storage means to an input of said signal comparator; transmission path means for connecting the output of said tachogenerator to an input of said signal comparator whereby said transmission path means provides an output signal corresponding to the momentary phase of the pulse train supplied by the tachogenerator, and whereby the signal comparator compares the two phase indicating signals applied to its two inputs and provides an output pulse each time said two signals at said comparator inputs equal each other; and said second switch means operable in said "new recording" mode comprising means for connecting the output of the signal comparator to an input of said servo system.

2. An apparatus as claimed in claim 1, wherein means are provided for recording the output signal supplied by the signal comparator in the synchronization track in the "new recording" mode.

3. An apparatus as claimed in claim 1, wherein the second switching means comprises a gate circuit means for delaying the deactivation of said phase comparator and storage means and the connection of the signal comparator to said servo system until the occurrence of a pulse which follows upon selection of the said "new recording" mode and which defines the end of a measuring process, said gate circuit further comprising means responsive to said pulse following the selection of said "new recording" mode for discontinuing the supply of signals to the storage device.

4. Apparatus as claimed in claim 3, wherein the phase comparison and storage device includes a bistable multivibrator having two inputs, one input of the multivibrator being connected to the tachogenerator for supplying pulses for setting the bistable multivibrator to one state and the other input of the multivibrator being connected to the pulses scanned from the synchronization track for setting the bistable multivibrator to its other state, switching means responsive to said multivibrator for selectively connecting the storage device whose output is connected to an input of the signal comparator to the transmission path which is connected to the other input of the signal comparator and which is included for the formation of the reference signal.

5. An apparatus as claimed in claim 4, wherein the transmission path for the formation of the reference signal includes a first counter which has a count input and a rest input, an auxiliary pulse source, pulses from the auxiliary pulse source being applied to its count input for advancing the counter and pulses supplied by the tachogenerator being applied to its reset input for resetting the counter to its initial state, and the storage device is constituted by a second similar counter, said bistable multivibrator further comprising means responsive to a pulse supplied by the tachogenerator for connecting a reset input of the second counter to the reset input of the first counter for being reset to its initial states and for connecting the count input of the second counter to the auxiliary pulse source.

6. An apparatus as claimed in claim 5, wherein the frequency of the line pulses of the signal to be recorded is an integral multiple of the frequency of the pulses from the auxiliary pulse source.

7. An apparatus as claimed in claim 4, wherein the transmission path for the formation of the reference signal includes a sawtooth generator which is synchronized by the pulses supplied by the tachogenerator, and that the phase comparison and storage device is constituted by a capacitor, the capacitor being connected to the output of the sawtooth generator in response to a switching process which is performed by the bistable multivibrator and which is initiated by a pulse supplied by the tachogenerator.

8. An apparatus as claimed in claim 3, wherein the transmission path provided for the formation of the reference signal includes a first signal generator, and wherein the measuring and storage device includes a second signal generator for the production of periodic signals with different rise times, said generators each having a reset input, via which the relevant generator can be reset to an initial state upon the application of a pulse-shaped signal, pulses supplied by the tachogenerator being applied to the reset input of the first signal generator, which produces signals with a long rise time, and the pulses which are scanned from the synchronization track being applied to the reset input of the second signal generator, which supplies signals with a short rise time, the outputs of these signal generators being connected to the input of the comparator, and the second signal generator comprising a further input which is connected to the output of the signal comparator, by means of which upon the appearance of an output signal of the comparator the signal generator is clamped at its instantaneous value, which value is stored in the storage device.

9. An apparatus as claimed in claim 8, wherein at least a second signal generator is constituted by a counter which is driven by an auxiliary pulse source.

10. An apparatus as claimed in claim 8, wherein the rise time of the signals supplied by the second signal generator is at least 100 times shorter than the rise time of the signals supplied by the first signal generator.

* * * * *